(12) United States Patent
Chu

(10) Patent No.: US 7,291,205 B2
(45) Date of Patent: Nov. 6, 2007

(54) AIR CLEANER

(75) Inventor: Euy Sung Chu, Anyang-Si (KR)

(73) Assignee: Samsung Electronics, Co., Ltd., Suwon (KR)

( * ) Notice: Subject to any disclaimer, the term of this patent is extended or adjusted under 35 U.S.C. 154(b) by 330 days.

(21) Appl. No.: 10/958,333

(22) Filed: Oct. 6, 2004

(65) Prior Publication Data

US 2005/0132681 A1     Jun. 23, 2005

(30) Foreign Application Priority Data

Dec. 22, 2003   (KR) .................... 10-2003-0095007

(51) Int. Cl.
*B01D 46/00* (2006.01)
(52) U.S. Cl. ............................ 96/55; 55/471; 55/485; 55/486; 96/134; 422/186.3
(58) Field of Classification Search ................ 55/471, 55/472, 485, 473, 467, 486; 96/66, 69, 134, 96/135, 224, 55; 422/186.3
See application file for complete search history.

(56) References Cited

U.S. PATENT DOCUMENTS

| | | | | |
|---|---|---|---|---|
| 5,993,738 A | * | 11/1999 | Goswani | 422/22 |
| 5,997,619 A | * | 12/1999 | Knuth et al. | 96/224 |
| 6,464,760 B1 | * | 10/2002 | Sham et al. | 96/117.5 |

FOREIGN PATENT DOCUMENTS

| | | | | |
|---|---|---|---|---|
| JP | 63-20019 | * | 1/1988 | ............... 55/467 |
| JP | 4-89064 | * | 3/1992 | |
| JP | 5-245325 | * | 9/1993 | ........... 55/DIG. 39 |
| JP | 07-098134 A | | 4/1995 | |
| JP | 11-253750 | * | 9/1999 | |
| JP | 2003-074924 A | | 3/2003 | |
| KR | 2001-0028798 A | | 4/2001 | |
| KR | 0056986 | * | 8/2003 | |

* cited by examiner

*Primary Examiner*—Duane Smith
*Assistant Examiner*—Sonji Turner
(74) *Attorney, Agent, or Firm*—Sughrue Mion, PLLC

(57) ABSTRACT

An air cleaner eliminates moisture laden in air, thus preventing the moisture from being added to a dust collecting filter and, for example, a deodorizing filter, therefore preventing performance of the dust collecting filter and the deodorizing filter from being deteriorated. The air cleaner includes a cabinet having an air inlet port and an air outlet port, a blowing unit provided in the cabinet to circulate air from the air inlet port to the air outlet port, and a filtering unit provided between the air inlet port and the air outlet port to filter the air drawn into the cabinet. The filtering unit includes a dehumidifying filter to adsorb moisture laden in the air, a dust collecting filter to collect dust laden in the air, and a deodorizing filter to remove an odor from the air. In this case, the dehumidifying filter is placed nearer to the air inlet port in comparison with both the dust collecting filter and the deodorizing filter.

14 Claims, 4 Drawing Sheets

AIR CLEANER

CROSS REFERENCE TO RELATED APPLICATION

This application claims the benefit of Korean Patent Application No. 2003-95007, filed on Dec. 22, 2003 in the Korean Intellectual Property Office, the disclosure of which is incorporated herein by reference.

BACKGROUND OF THE INVENTION

1. Field of the Invention

Apparatuses consistent with the present invention relate, in general, to air cleaners and, more particularly, to an air cleaner having a dehumidifying filter to remove moisture from air.

2. Description of the Related Art

Generally, an air cleaner is an appliance that removes dust or an odor from air to clean the air. The air cleaner includes a cabinet having an air inlet port and an air outlet port. A blowing unit is provided in the cabinet, and generates a blowing force to draw air into the cabinet through the air inlet port and discharge the air to an outside of the cabinet through the air outlet port. A filtering unit is provided at a predetermined position between the air inlet port and the air outlet port to remove the dust or the odor from the air drawn into the cabinet.

The filtering unit includes a pre filter, a dust collecting filter, and a deodorizing filter. The pre filter functions to primarily filter relatively large dust particles. The dust collecting filter collects fine dust particles passing through the pre filter. The deodorizing filter removes the odor from the air. In this case, the pre filter, the dust collecting filter, and the deodorizing filter are sequentially arranged in a direction from the air inlet port to the air outlet port.

An electrostatic dust filter which uses ionization of dust particulates or a HEPA (high efficiency particulate air) filter which includes a filter paper produced in a form of a non-woven fabric using asbestos is used as the dust collecting filter. Further, an activated carbon filter or a photocatalytic filter is used as the deodorizing filter. In this case, the activated carbon filter adsorbs the odor laden in the air. The photocatalytic filter eliminates germs in addition to removing the odor from the air.

In the air cleaner constructed as described above, when the blowing unit operates, the air is drawn into the cabinet through the air inlet port. The air sequentially passes through the pre filter, the dust collecting filter, and the deodorizing filter. Thereafter, the air is discharged through the air outlet port to the outside of the cabinet. At this time, impurities, such as the dust or the odor, are removed from the air.

However, the conventional air cleaner has a problem in that the air cleaner is not provided with a filter to remove moisture laden in the air, so that performance of the dust collecting filter and the deodorizing filter are deteriorated when the moisture is added to the dust collecting filter or the deodorizing filter and adhered to a surface of the dust collecting filter or the deodorizing filter.

In a detailed description, when the moisture is adhered to the surface of the dust collecting filter or the deodorizing filter, the moisture absorbs contaminants laden in the air. Thus, a pollution level of the dust collecting filter or the deodorizing filter is increased, or the contaminants mixed with the moisture block pores of the dust collecting filter or the deodorizing filter, thus reducing a flux of the dust collecting filter or the deodorizing filter. Thereby, the dust collecting filter or the deodorizing filter must be frequently replaced with new one, and a life span of the dust collecting filter or the deodorizing filter is reduced. Further, filtering efficiency of the dust collecting filter or the deodorizing filter is reduced.

The electrostatic dust filter and the photocatalytic filter are operated by electric power. Thus, when the moisture may be added to the electrostatic dust filter and the photocatalytic filter, there may occur electrical disorder in the electrostatic dust filter and the photocatalytic filter. Further, the moisture may hinder adsorbing action of an activated carbon filter to adsorb the odor.

SUMMARY OF THE INVENTION

Illustrative, non-limiting embodiments of the present invention overcome the above disadvantages and other disadvantages not described above. Also, the present invention is not required to overcome the disadvantages described above, and illustrative, non-limiting embodiment of the present invention may not overcome any of the problems described above.

Therefore, it is an aspect of the present invention to provide an air cleaner which prevents moisture from being added to a dust collecting filter or a deodorizing filter, thus preventing performance of the dust collecting filter or the deodorizing filter from being deteriorated and improving the filtering efficiency of the air cleaner.

Additional aspects and/or advantages of the invention will be set forth in part in the description which follows and, in part, will be obvious from the description, or may be learned by practice of the invention.

The above and/or other aspects are achieved by an air cleaner, including a cabinet having an air inlet port and an air outlet port, a blowing unit provided in the cabinet to circulate air from the air inlet port to the air outlet port, and a filtering unit provided at a predetermined position between the air inlet port and the air outlet port to filter the air drawn into the cabinet. The filtering unit includes a dust collecting filter to collect dust, and a dehumidifying filter to adsorb moisture laden in the air.

According to an aspect of the invention, the dehumidifying filter is provided to be nearer to the air inlet port in comparison with the dust collecting filter.

In another aspect of the invention, the air cleaner includes a deodorizing filter to remove odor from the air.

The above and/or other aspects are achieved by an air cleaner, including a cabinet having an air inlet port and an air outlet port, a blowing unit provided in the cabinet to circulate air from the air inlet port to the air outlet port, and a filtering unit provided at a predetermined position between the air inlet port and the air outlet port to filter the air drawn into the cabinet. The filtering unit includes a first filtering unit provided at a position adjacent to the air inlet port to primarily filter the air, a second filtering unit provided at a position adjacent to the air outlet port to collect dust laden in the air and remove an odor from the air, and a dehumidifying filter provided between the first and second filtering units to adsorb moisture laden in the air.

According to an aspect of the invention, the dust collecting filter may include an electrostatic dust filter and a HEPA (high efficiency particulate air) filter.

In another aspect of this embodiment, the deodorizing filter may include an activated carbon filter and a photocatalytic filter.

In yet another aspect of this embodiment, the dehumidifying filter may include a moisture adsorbing material having a plurality of pores.

In still another aspect of this embodiment, the moisture adsorbing material may include an odor adsorbing element.

In yet another aspect of this embodiment, the odor adsorbing element may include zeolite.

In another aspect of this embodiment, the dehumidifying filter may be disposed in the cabinet having various shapes.

BRIEF DESCRIPTION OF THE DRAWINGS

These and other aspects and advantages of the invention will become apparent and more readily appreciated from the following description of the illustrative, non-limiting embodiments, taken in conjunction with the accompanying drawings in which.

DETAILED DESCRIPTION OF ILLUSTRATIVE, NON-LIMITING EMBODIMENTS OF THE INVENTION

Figure 1:
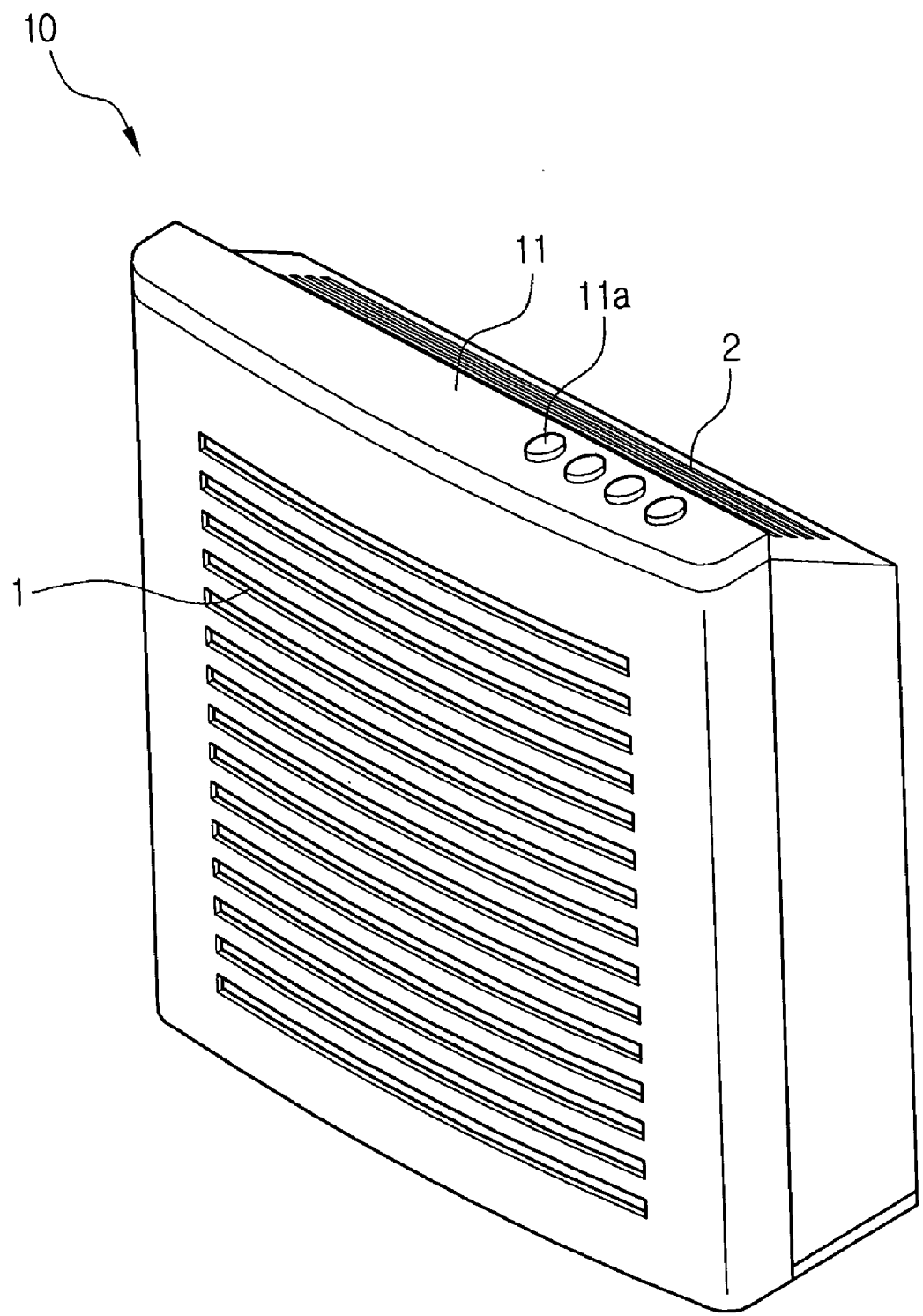
FIG. 1 is a perspective view to show an exterior construction of an air cleaner, according to an exemplary embodiment of the present invention.

Reference will now be made in detail to illustrative, non-limiting embodiments of the present invention, examples of which are illustrated in the accompanying drawings, wherein like reference numerals refer to like elements throughout. The embodiments are described below in order to explain the present invention by referring to the figures.

Figure 2:
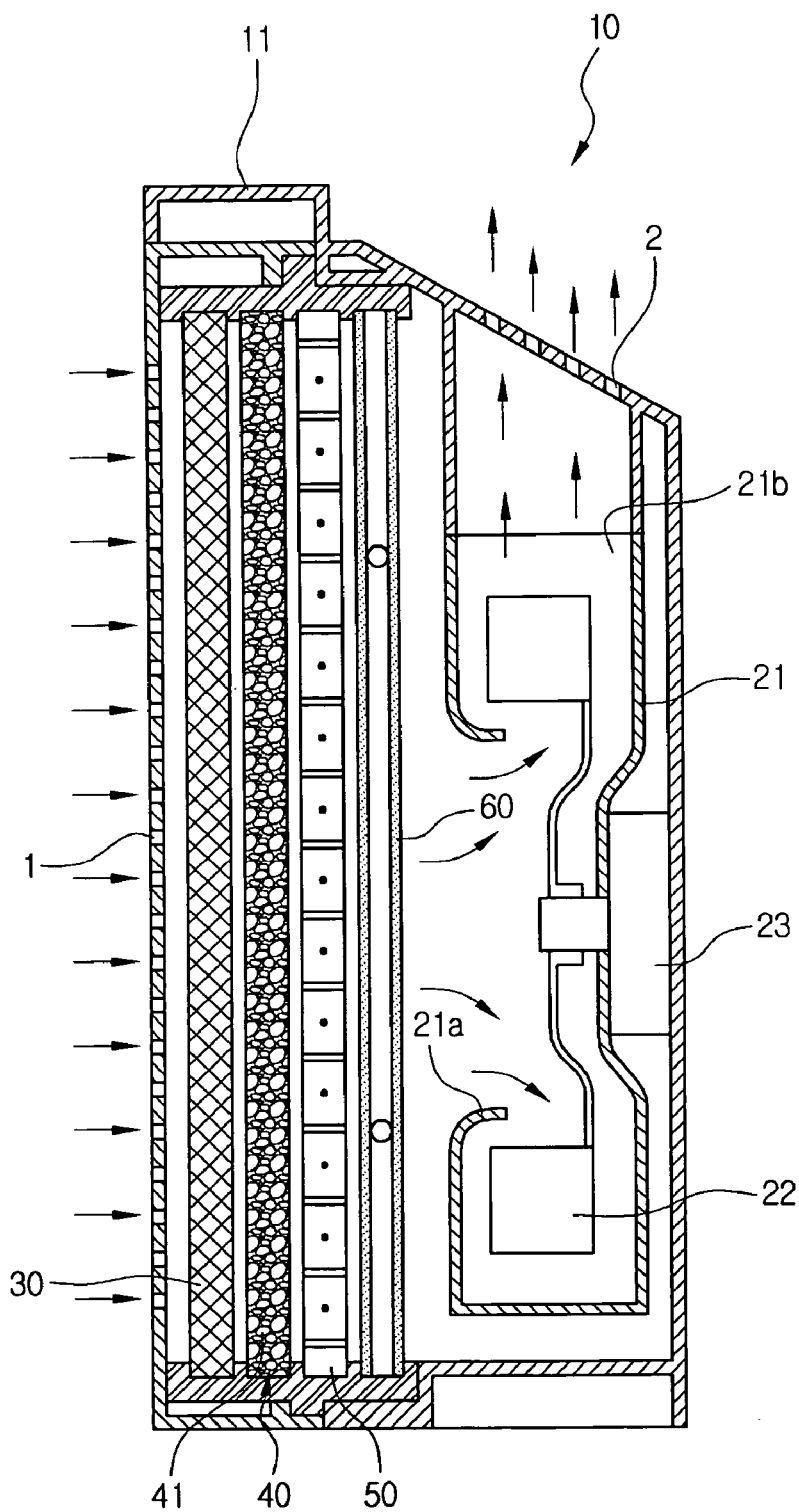
FIG. 2 is a sectional view to show an interior construction of the air cleaner of FIG. 1.

As shown in FIGS. 1 and 2, an air cleaner according to an embodiment of the present invention includes a cabinet 10. An air inlet port 1 is provided on a front of the cabinet 10, and an air outlet port 2 is provided at an upper portion of a rear portion of the cabinet 10. A control panel 11 is provided on a top of the front of the cabinet 10, and includes a plurality of control buttons 11a to control an operation of the air cleaner.

A blowing unit is interiorly provided at the rear portion of the cabinet 10 to be positioned between the air inlet port 1 and the air outlet port 2, and generates a blowing force. The blowing unit includes a fan casing 21. An inlet 21a is provided at a center of the fan casing 21, and an outlet 21b is provided at an upper portion of the fan casing 21 to communicate with the air outlet port 2. The blowing unit also includes, for example, a centrifugal fan 22 and a motor 23. The centrifugal fan 22 is rotatably provided in the fan casing 21 to draw air through the inlet 21a and blow the air to the air outlet port 2. The motor 23 is provided on a rear portion of the fan casing 21 to drive the centrifugal fan 22.

When the centrifugal fan 22 is rotated by an operation of the motor 23, the air is drawn from an outside of the cabinet 10 to an inside of the cabinet 10 through the air inlet port 1. Thereafter, the air passes through the fan casing 21 and the air outlet port 2, and then is discharged to the outside of the cabinet 10.

Further, a filtering unit is provided in the cabinet 10 to be placed between the air inlet port 1 and the fan casing 21, and removes dust and contaminants from the air drawn into the cabinet 10. The filtering unit may include a pre filter 30, a dust collecting filter 50, a deodorizing filter 60, and a dehumidifying filter 40. The pre filter 30 constitutes a first filtering unit which is disposed to be adjacent to the air inlet port 1, and primarily filters the air. The dust collecting filter 50 and the deodorizing filter 60 constitute a second filtering unit which is placed to be adjacent to the air outlet port 2. The dust collecting filter 50 and the deodorizing filter 60 remove fine dust and an odor from the air, respectively, thus functioning to collect the dust and eliminate the odor. The dehumidifying filter 40 is provided between the first and second filtering units to adsorb moisture.

In this case, the dehumidifying filter 40 includes a moisture adsorbing material 41 having a plurality of pores which are smaller than moisture particles. The dehumidifying filter 40 adsorbs the moisture laden in the air, thus enhancing dehumidifying efficiency of the air cleaner. In order to remove the moisture prior to being added to the second filtering unit, the dehumidifying filter 40 is placed in front of the second filtering unit, thus preventing performance of the dust collecting filter 50 and the deodorizing filter 60 from being deteriorated due to the moisture.

The pre filter 30, primarily filtering the air, has a net structure with relatively large meshes to filter relatively large dust particles. Because the dehumidifying filter 40 is provided in back of the pre filter 30 and the large dust particles are filtered by the pre filter 30, the large dust particles are prevented from blocking pores of the dehumidifying filter 40. Although FIG. 3 shows the use of a single dehumidifying filter 40, multiple dehumidifying filters may be utilized, e.g., by placing an additional dehumidifying filter between the dust collecting filter 50 and the deodorizing filter 60 thereby to increase the filtering efficiency of the air cleaner.

Figure 3:
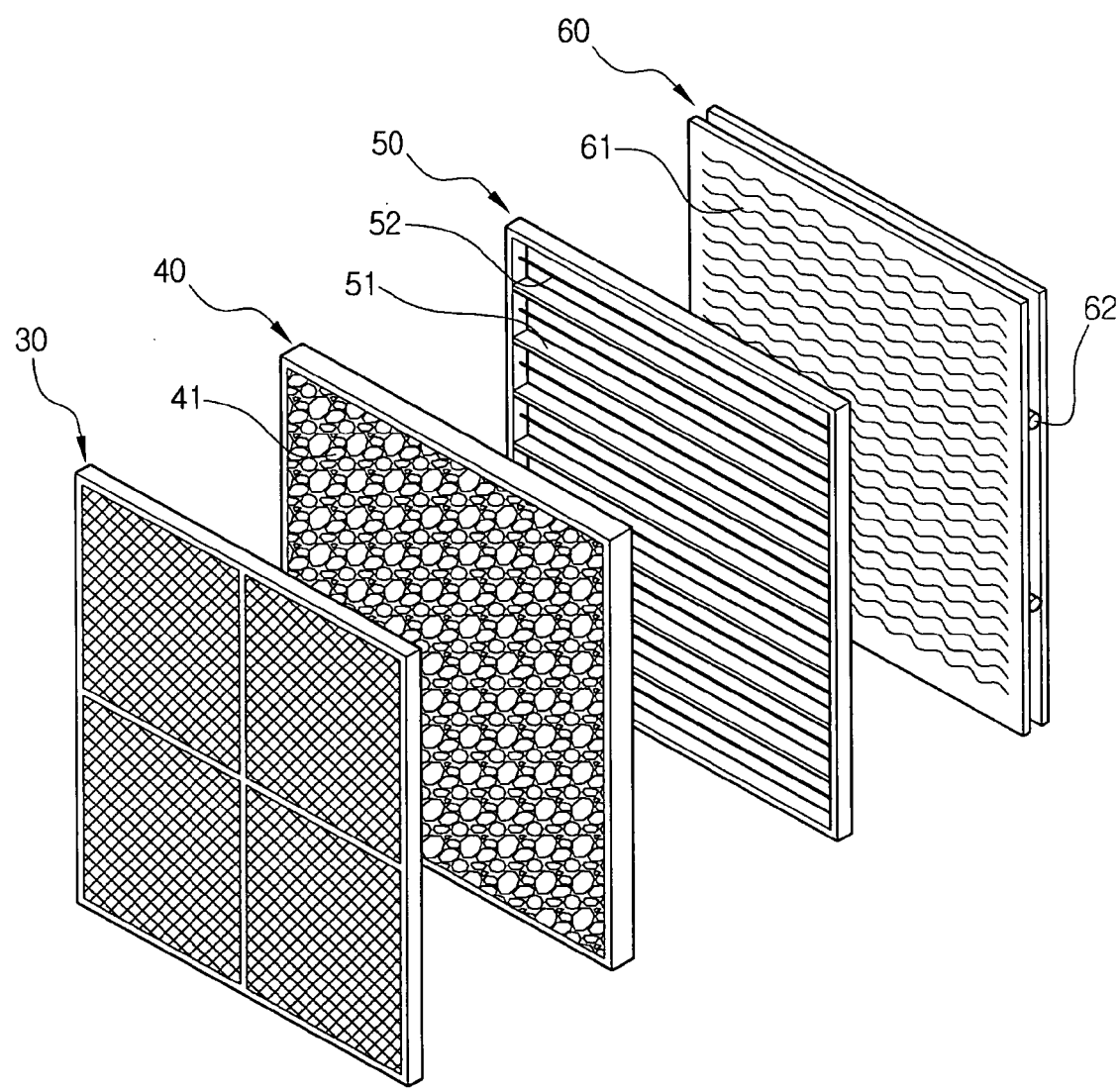
FIG. 3 is an exploded perspective view of a filtering unit of the air cleaner of FIG. 1.

As shown in FIG. 3, an electrostatic dust filter may be used as the dust collecting filter 50. The electrostatic dust filter includes a plurality of ground electrodes 51 and discharge lines 52 which are arranged in parallel to each other, to collect dust using ionization of dust particles. Further, a photocatalytic filter may be used as the deodorizing filter 60. The photocatalytic filter includes a photocatalytic part 61 on which a photocatalytic material is coated, and ultraviolet lamps 62. Thus, the photocatalytic material reacts with ultraviolet rays radiated from the ultraviolet lamps 62, thus removing odor or germs from the air.

Since the dust collecting filter 50 has the ground electrodes 51 and the deodorizing filter 60 has the ultraviolet lamps 62, the dust collecting filter 50 and the deodorizing filter 60 are operated by electric power. Thus, when moisture is added to the dust collecting filter 50 or the deodorizing filter 60, the electrical disorder occurs in the dust collecting filter 50 or the deodorizing filter 60, thus reducing dust collecting efficiency or deodorizing efficiency of the air cleaner. However, the air cleaner according to the present invention is constructed so that the moisture is removed by the dehumidifying filter 40 provided in front of the second filtering unit before the moisture is added to the dust collecting filter 50 or the deodorizing filter 60. Thus, there is no electrical disorder in the dust collecting filter 50 and the deodorizing filter 60.

Further, the moisture is not added to the dust collecting filter 50 or the deodorizing filter 60 by the dehumidifying filter 40 placed in front of the dust collecting filter 50 and the deodorizing filter 60, thus preventing the moisture from being adhered to a surface of the dust collecting filter 50 or the deodorizing filter 60 and absorbing dust or contaminants. Thereby, a pollution level of the dust collecting filter 50 or the deodorizing filter 60 are prevented from being increased, and the pores of the dust collecting filter 50 or the deodorizing filter 60 are prevented from being blocked, thus enhancing the flux. Further, the dust collecting filter 50 and the deodorizing filter 60 need not to be frequently replaced with new ones, and life spans of the dust collecting filter 50 and the deodorizing filter 60 are prolonged. Furthermore, the dust collecting efficiency and the deodorizing efficiency are increased.

Because the dehumidifying filter 40 is provided in front of the dust collecting filter 50, the dehumidifying filter 40 filters some of dust passing through the pre filter 30 prior to the dust collecting filter 50. Thus, a load applied to the dust collecting filter 50 is reduced. The moisture adsorbing material 41 of the dehumidifying filter 40 may contain an odor adsorbing element, such as zeolite, so that the dehumidifying filter 40 adsorbs the odor as well as the moisture, thus reducing a load applied to the deodorizing filter 60.

Figure 4:
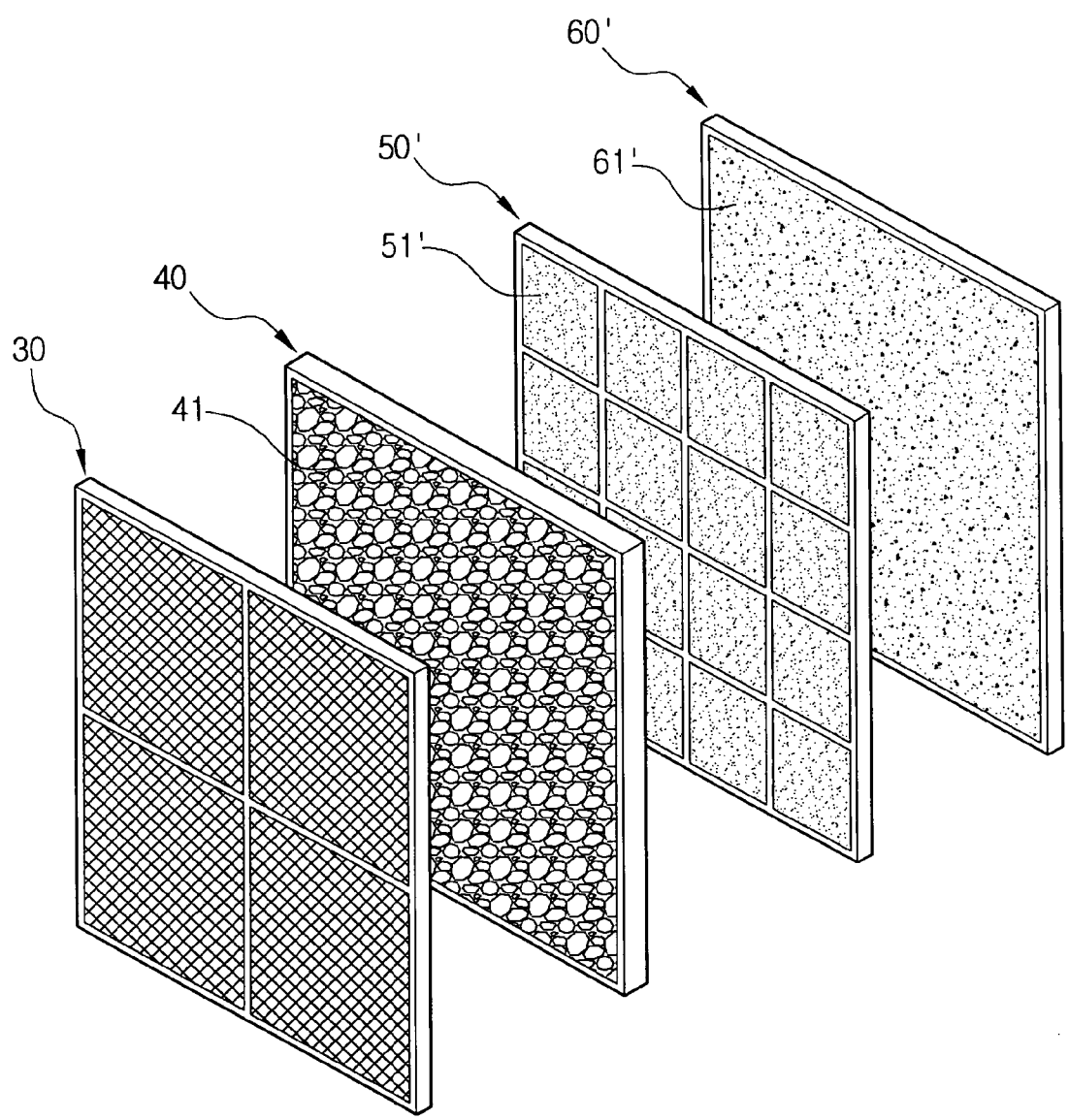
FIG. 4 is an exploded perspective view of a filtering unit of an air cleaner, according to another exemplary embodiment of the present invention.

According to another embodiment shown in FIG. 4, in the second filtering unit, a HEPA (high efficiency particulate air) filter is used as a dust collecting filter 50', and an activated carbon filter is used as a deodorizing filter 60'. The HEPA filter includes a filter paper 51' which is produced in a form of a non-woven fabric using charged fiber, for example, asbestos. The activated carbon filter includes activated carbon 61' to adsorb the odor. Similarly to the air cleaner shown in FIGS. 1 to 3, the dehumidifying filter 40 is provided between the second filtering unit and the pre filter 30, thus preventing the moisture from being added to the second filtering unit. Therefore, the activated carbon filter efficiently adsorbs the odor, and pores of the dust collecting filter 50' and the deodorizing filter 60' are not blocked by the moisture, thus preventing performance of the dust collecting filter 50' and the deodorizing filter 60' from being deteriorated and thereby enhancing dust collecting efficiency and deodorizing efficiency of the air cleaner. Of course, other types of filters may be used as the dust collecting filter and the deodorizing filter of the second filtering unit. In the above state, when the dehumidifying filter 40 is placed in front of the dust collecting filter and the deodorizing filter, the dehumidifying filter 40 prevents performance of the dust collecting filter and the deodorizing filter from being deteriorated.

The operation and operational effects of the air cleaner according to the present invention will be described in detail in the following.

When the centrifugal fan 22 is rotated by the operation of the motor 23, air is drawn from the outside of the cabinet 10 to the inside of the cabinet 10 through the air inlet port 1. Thereafter, the air passes through the fan casing 21 and the air outlet port 2, and then is discharged to the outside of the cabinet 10.

While the air drawn into the cabinet 10 through the air inlet port 1 passes through the pre filter 30 which is placed to be adjacent to the air inlet port 1, relatively large dust particles are primarily filtered. Next, the air passes through the dehumidifying filter 40 which is placed in back of the pre filter 30, so that the moisture laden in the air is adsorbed by the dehumidifying filter 40. Thus, the air passing through the dehumidifying filter 40 does not contain the moisture, so that the moisture is not added to the dust collecting filter 50, 50' and the deodorizing filter 60, 60' which are placed in back of the dehumidifying filter 40. Thus, there is no electric disorder in the dust collecting filter 50, 50' and the deodorizing filter 60, 60', and the pores of the dust collecting filter 50, 50' and the deodorizing filter 60, 60' are not blocked, thus preventing performance of the dust collecting filter 50, 50' and the deodorizing filter 60, 60' from being deteriorated.

After the air passes through the dehumidifying filter 40, the air sequentially passes through the dust collecting filter 50, 50' and the deodorizing filter 60, 60', so that fine dust particles and an odor are removed from the air. Therefore, clean air is discharged to the outside of the cabinet 10 through the air outlet port 2.

Further, the dehumidifying filter 40 provided in front of the dust collecting filter 50, 50' filters some of the dust passing through the pre filter 30, prior to the dust collecting filter 50, 50'. Thus, the load applied to the dust collecting filter 50, 50' is reduced. The dehumidifying filter 40 contains the odor adsorbing element, such as the zeolite, so that the dehumidifying filter 40 adsorbs the odor as well as the moisture, thus reducing the load applied to the deodorizing filter 60, 60'. Thereby, the dust collecting efficiency of the dust collecting filter 50, 50' and the deodorizing efficiency of the deodorizing filter 60, 60' are increased.

As is apparent from the above description, the present invention provides an air cleaner having a dehumidifying filter which is placed to be adjacent to an air inlet port in front of a dust collecting filter and may also provide a deodorizing filter so as to remove moisture from air, thus preventing the moisture laden in the air drawn into a cabinet from being added to the dust collecting filter and the deodorizing filter, therefore preventing performance of the dust collecting filter and the deodorizing filter from being deteriorated.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air cleaner, comprising:
a cabinet including an air inlet port and an air outlet port;
a blowing unit provided in the cabinet to circulate air from the air inlet port to the air outlet port; and
a filtering unit provided at a predetermined position between the air inlet port and the air outlet port to filter the air drawn into the cabinet, the filtering unit comprising:
a dust collecting filter to collect dust;
a deodorizing filter to remove an odor from the air; and
a dehumidifying filter to adsorb moisture laden in the air, the dehumidifying filter being provided to be nearer to the air inlet port in comparison with both the dust collecting filter and the deodorizing filter.

2. The air cleaner according to claim 1, wherein the dust collecting filter comprises an electrostatic dust filter and a HEPA (high efficiency particulate air) filter.

3. The air cleaner according to claim 1, wherein the deodorizing filter comprises an activated carbon filter and a photocatalytic filter.

4. The air cleaner according to claim 1, wherein the dehumidifying filter comprises a moisture adsorbing material having a plurality of pores.

5. The air cleaner according to claim 4, wherein the moisture adsorbing material comprises an odor adsorbing element.

6. The air cleaner according to claim 5, wherein the odor adsorbing element comprises zeolite.

7. An air cleaner, comprising:
a cabinet including an air inlet port and an air outlet port;
a blowing unit provided in the cabinet to circulate air from the air inlet port to the air outlet port; and
a filtering unit provided at a predetermined position between the air inlet port and the blowing unit to filter the air drawn into the cabinet, the filtering unit comprising:

a first filtering unit provided at a position adjacent to the air inlet port to primarily filter the air;

a second filtering unit provided at a position adjacent to the air outlet port to collect dust laden in the air and remove an odor from the air; and a dehumidifying filter provided between the first and second filtering units to adsorb moisture laden in the air, wherein the second filtering unit comprises a dust collecting filter and a deodorizing filter, and wherein the dust collecting filter comprises an electrostatic dust filter and a HEPA (high efficiency particulate air) filter.

8. The air cleaner according to claim 7, wherein the deodorizing filter comprises an activated carbon filter and a photocatalytic filter.

9. The air cleaner according to claim 7, wherein the dehumidifying filter comprises a moisture adsorbing material having a plurality of pores.

10. The air cleaner according to claim 9, wherein the moisture adsorbing material comprises an odor adsorbing element.

11. The air cleaner according to claim 1, wherein the odor adsorbing element comprises zeolite.

12. An air cleaner, comprising:

a cabinet including an air inlet and air outlet;

a first unit to filter out dust in the air; and a second unit to adsorb moisture laden in the air, wherein the second unit is provided to be nearer to the air inlet in comparison with the first unit.

13. The air cleaner according to claim 12, wherein the second unit comprises a moisture adsorbing material.

14. The air cleaner according to claim 13, wherein the adsorbing materials comprise a plurality of pores.

* * * * *